United States Patent [19]
Juechter

[11] 3,768,416
[45] Oct. 30, 1973

[54] METAL RUNNERS FOR PALLET

[75] Inventor: Raymond F. Juechter, Glenwood, Ill.

[73] Assignee: Interlake, Inc., Chicago, Ill.

[22] Filed: May 18, 1971

[21] Appl. No.: 144,551

[52] U.S. Cl. .............................................. 104/135
[51] Int. Cl............................................. A63g 21/00
[58] Field of Search................... 193/35 R; 104/135, 104/134; 214/54

[56] References Cited
UNITED STATES PATENTS

| | | | |
|---|---|---|---|
| 3,026,817 | 3/1962 | Sebastian et al.................... | 104/135 |
| 1,923,785 | 8/1933 | Holan .............................. | 214/38 D |
| 3,010,409 | 11/1961 | Good et al.......................... | 104/135 |
| 2,896,549 | 7/1959 | Swanson............................ | 104/135 |

*Primary Examiner*—Gerald M. Forlenza
*Assistant Examiner*—D. W. Keen
*Attorney*—Prangley, Dithmar, Vogel, Sandler & Stotland

[57] ABSTRACT

A rectangular pallet is provided with a pair of integral single-piece metal runners along opposite side edges of the pallet bottom for guiding the pallet along a conveyor having two parallel spaced-apart flights of rollers, each runner including a base plate having a serrated bearing surface thereon, a guide ridge formed in the bearing surface and extending along the inner side edge thereof and provided with ends curved toward the adjacent side edge of said base plate, an attachment flange extending upwardly from the outer side edge of the base plate for engaging the adjacent side surface of the pallet, and end flanges respectively extending upwardly from the opposite ends of the base plate for engaging the adjacent ends of the pallet, the runners being secured to the pallet by fasteners extending through complementary openings in the base plates and the attachment flanges, the runners being disposed in use with the bearing surfaces respectively engaging the flights of rollers and with the guide ridges disposed along the inner side edges of the adjacent rollers for laterally positioning the pallet with respect thereto.

1 Claim, 6 Drawing Figures

PATENTED OCT 30 1973 3,768,416
SHEET 1 OF 2
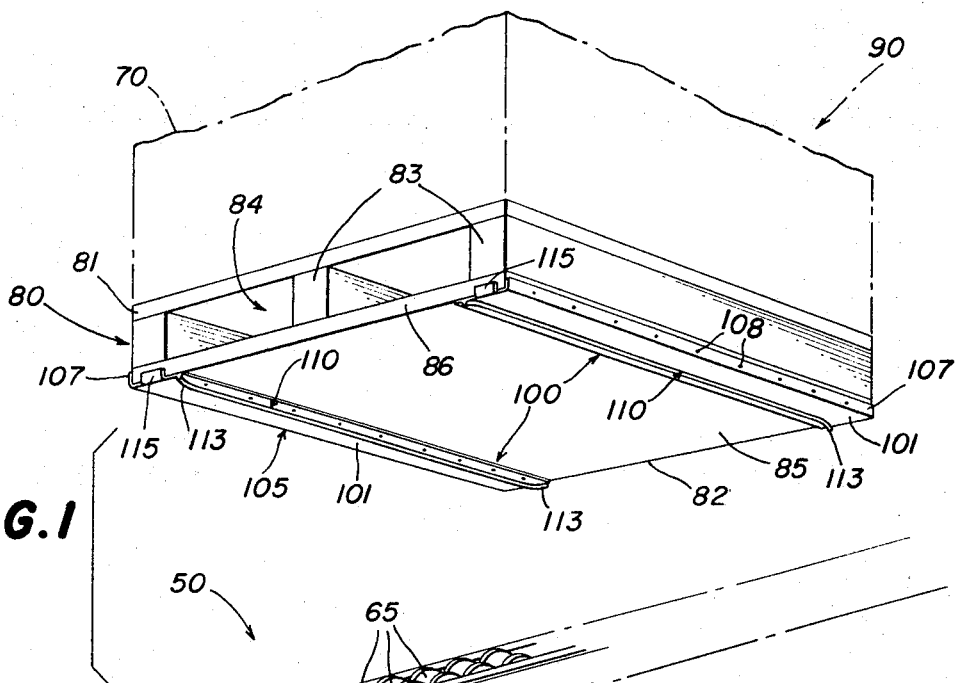
FIG. 1
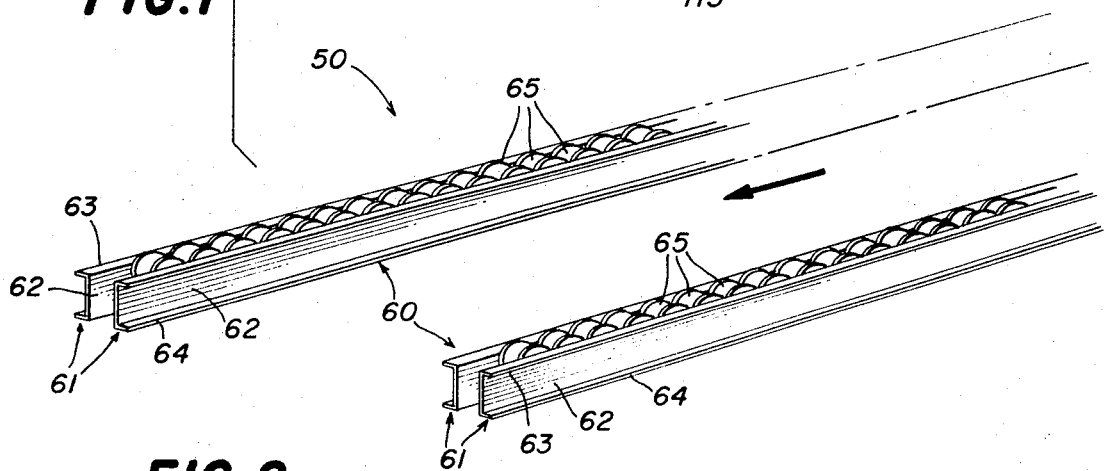
FIG. 2
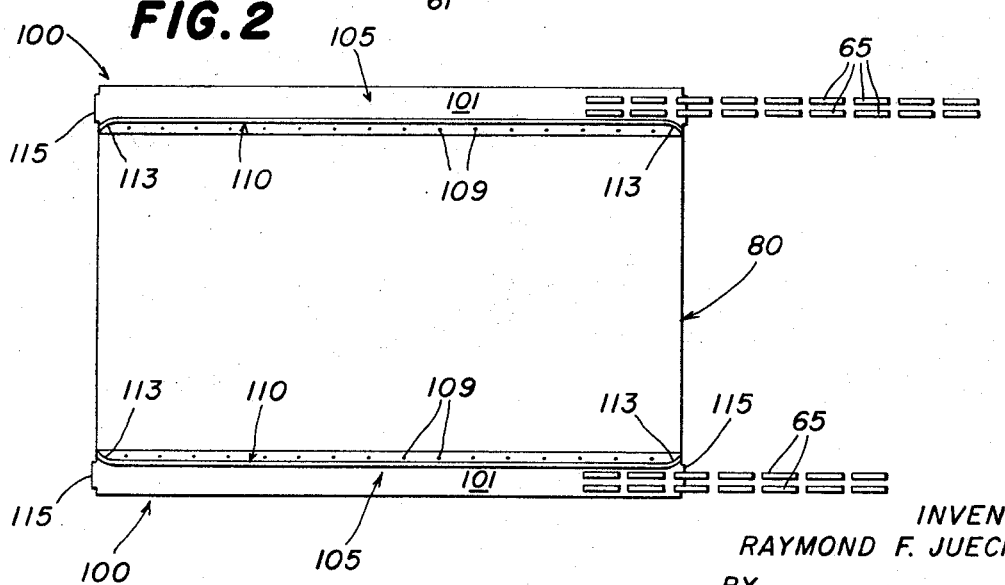
INVENTOR
RAYMOND F. JUECHTER
BY Prangley, Clayton, Mullin,
Dithmar & Vogel
ATTYS.

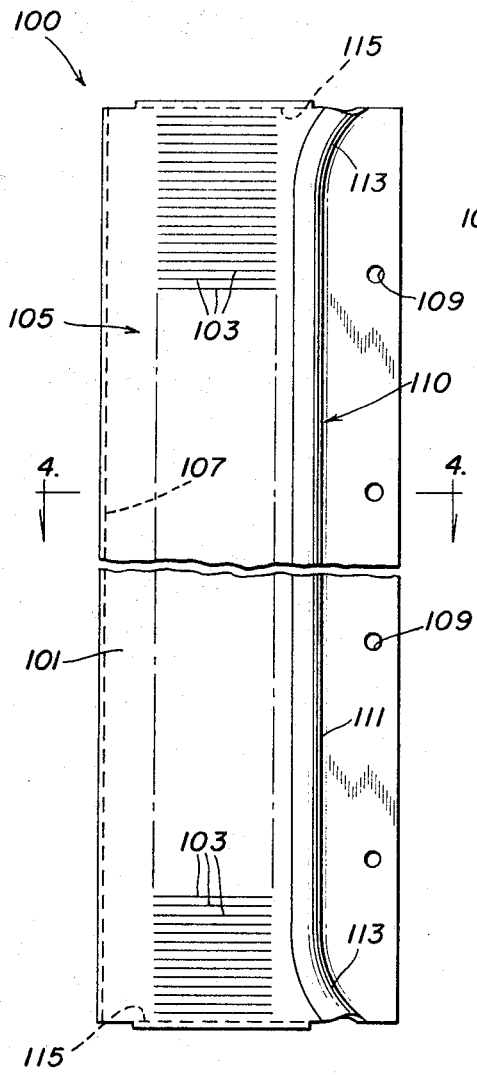
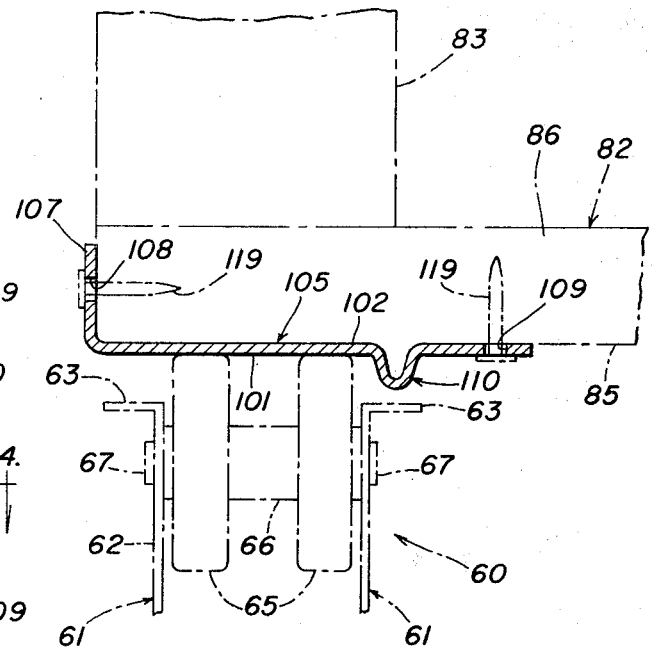
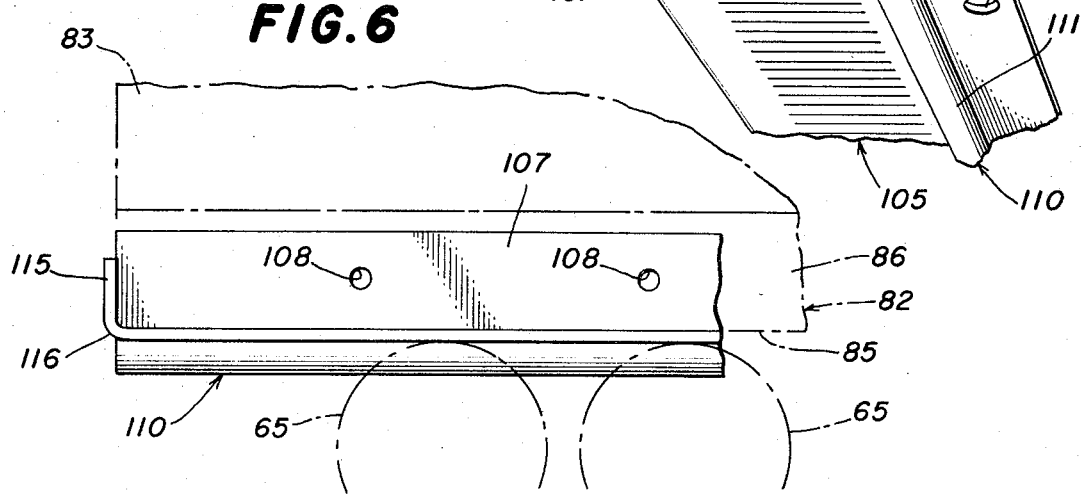

METAL RUNNERS FOR PALLET

This invention relates to conveyor systems for conveying palletized loads therealong and, more particularly, to novel pallets provided with runners thereon to facilitate passage thereof along the conveyor.

It is a general object of this invention to provide a pallet having runners extending along the bottom thereof for engagement with parallel flights of rollers of a conveyor for guiding the pallet along the conveyor.

It is an important object of this invention to provide a system for conveying packages or the like along an associated conveyor having a pair of parallel laterally spaced-apart flights of rollers, the combination comprising a pallet adapted for attachment to the bottom of the associated package for supporting the package thereon, and a pair of elongated runners respectively disposed on the bottom of the pallet substantially parallel to each other and spaced apart for respectively being received on the associated flights of rollers, each of the runners including a base plate having a bearing surface thereon, and a guide member projecting downwardly from the base plate and extending longitudinally thereof adjacent to one lateral edge thereof, the bearing surfaces being respectively disposed in use in engagement with the associated flights of rollers and extending longitudinally thereof to facilitate rolling movement of the pallet therealong, the guide members being respectively disposed in use along corresponding lateral edges of the associated flights of rollers for cooperation therewith and with each other positively to guide the pallet along the associated conveyor.

Still another object of this invention is to provide a runner for a pallet adapted to be provided with a pair of such runners thereon in spaced-apart parallel relationship to guide the pallet along an associated conveyor having a pair of parallel flights of rollers laterally spaced apart for respectively raceiving the pallet runners thereon, each of the runners comprising an elongated base plate mounted on the bottom of the associated pallet and having a bearing surface thereon, the bearing surface being disposed in use in engagement with the adjacent one of the associated flights of rollers and extending longitudinally thereof to facilitate rolling movement of the associated pallet therealong, and a guide member projecting downwardly from the base plate and extending longitudinally thereof adjacent to one lateral edge thereof, the guide member being disposed in use along one lateral edge of the adjacent flight of rollers for cooperation therewith and with the other associated flight and runner positively to guide the pallet along the associated conveyor.

Further features of the invention pertain to the particular arrangement of the parts of the pallet runners whereby the above-outlined and additional operating features thereof are attained.

The invention, both as to its organization and method of operation, together with further objects and advantages thereof will best be understood with reference to the following specification taken in connection with the accompanying drawings, in which:

FIG. 1 is a perspective view of a portion of a conveyor system, with pallet and runners constructed in accordance with and embodying the features of the present invention shown disposed above the conveyor before being lowered into sliding engagement therewith;

FIG. 2 is a reduced bottom plan view of the conveyor system of FIG. 1, with the pallet runners shown in their operative positions in engagement with the conveyor rollers;

FIG. 3 is an enlarged bottom plan view of a pallet runner constructed in accordance with and embodying the features of the present invention, with a portion of the runner broken away;

FIG. 4 is a view in vertical section taken along the line 4—4 in FIG. 3, and illustrating the orientation of the runner with respect to the pallet and the conveyor rollers;

FIG. 5 is a fragmentary perspective view of the pallet runner illustrated in FIG. 3; and FIG. 6 is a side elevational view of the runner illustrated in FIG. 5 as viewed from the left-hand side thereof, and illustrating the orientation of the runner with respect to the pallet and the conveyor rollers.

Referring now, in particular, to FIGS. 1 through 4 of the drawings, there is shown a conveyor system, generally designated by the numeral 50, which includes a pair of parallel spaced-apart flights of rollers, generally designated by the numeral 60. Each of the roller flights 60 includes a pair of laterally spaced-apart rails or frame members 61, each rail 61 being generally channel-shaped and including a substantially vertically extending bight portion 62 and a pair of outwardly extending flanges 63 and 64 respectively integral with and projecting laterally outwardly from the bight portion 62 along the upper and lower edges thereof. The rails 61 are arranged with the bight portions 62 thereof spaced apart a predetermined distance and facing each other, in parallel back-to-back relationship. Extending between the bight portions 62 of the pair of rails 61 and spaced apart longitudinally thereof is a plurality of roller shafts or axles 66, each provided with bearings 67 at the opposite ends thereof respectively received in corresponding openings in the bight portions 62 of the rails 61. Rotatably mounted on each of the shafts 66 between the rails 61 is a pair of laterally spaced-apart rollers 65, the radii of the rollers 65 being greater than the vertical distance between the axes of the shafts 66 and the tops of the upper flanges 63 so that the rollers 65 extend upwardly above the upper flanges 63 of the rails 61, the tops of the peripheral surfaces of the rollers 65 lying in a common tangential plane for supporting conveyed loads thereon in a well-known manner. Preferably, the conveyor 50 is of the gravity-operated type, the conveyed loads freely rolling along the rollers 65 under the urging of gravity, although it will be appreciated that the invention is also usable with powered conveyors.

Such a conveyed load is designated by the numeral 90 in FIG. 1 and may be of any desired type and configuration, but will normally be in the form of a box, carton or any other package 70 having a pallet 80 secured to the bottom thereof to facilitate handling thereof. Normally the package 70 and the pallet 80 will be generally rectangular in transverse cross-section, the pallet 80 being of a standard form and including an upper generally rectangular plate 81 and a lower generally rectangular plate 82 spaced from the upper plate 81 and disposed substantially congruent therewith. The upper and lower plates 81 and 82 are each secured to and are spaced apart by a plurality of longitudinally extending and laterally spaced-apart frame members 83, the frame members 83 cooperating to define longitudinally extending openings 84 therebetween to accommodate therein the tines of a fork lift truck, all in a well-known manner. In use, the load 90 is raised, lowered and moved about by a standard fork lift truck or crane or the like.

The present invention is particularly concerned with the conveying of a load 90 along the conveyor 50. For this purpose, the load 90 will normally be lifted by a fork lift truck, crane or the like to a position overlying conveyor 50, as illustrated in FIG. 1, and then will be lowered into position on the rollers 65 to be conveyed thereon. While the pallet 80 has dimensions sufficient to span the rollers 60 of the conveyor 50, it has been found desirable to provide guide means to guide the pallet 80 along the conveyor 50 and to prevent the pallet 80 from sliding side-ways off of the conveyor. Accordingly, there is provided in the present invention a pair of runners, each generally designated by the numeral 100, for attachment to the bottom plate 82 of the pallet 80. Each of the runners 100 is constructed as a mirror image of the other and, therefore, only one of the runners 100 will be described in detail.

Referring now also to FIGS. 3 through 6 of the drawings, each of the runners 100 includes a flat elongated base plate 105 having an upper attachment surface 102 and a bottom bearing surface 101 and dimensioned to extend longitudinally the length of the bottom plate 82 of the pallet 80. Formed on the bearing surface 101 of the runner 100 is a plurality of laterally extending and longitudinally spaced-apart serrations or grooves 103 defining a frictional tread-like surface for facilitating engagement of the bearing surface 101 with the conveyor in a manner to be described below. Integral with the base plate 105 along one lateral edge thereof, and extending upwardly therefrom substantially normal thereto is an attachment flange 107 extending the entire length of the base plate 105 and having a plurality of longitudinally spaced-apart openings 108 therein for a purpose to be described hereinafter. Similarly, a like plurality of longitudinally spaced-apart openings 109 are formed in the base plate 105 adjacent to the opposite lateral edge thereof.

Formed in the base plate 105 and extending longitudinally thereof between the row of openings 109 and the row of serrations 103 is a guide ridge 110 projecting downwardly of the bottom surface 101 of the base plate 105. The ridge 110 is formed by making a groove or depression in the upper surface 102 of the base plate 105 by any suitable means and thereby deforming the base plate 105 into the generally arcuate ridge 110, which extends downwardly below the plane of the bottom surface 101, as best illustrated in FIG. 4. The ridge 110 includes a straight center portion 111 disposed substantially parallel to the adjacent side edge of the base plate 105, and arcuate end portions 113 at the opposite ends of the center portion 111 and curved outwardly toward the adjacent side edge of the base plate 105.

Respectively integral with the opposite ends of the base plate 105 and extending upwardly therefrom substantially normal thereto are a pair of end tabs or flanges 115, shown in FIG. 6, and thereby forming rounded corners 116 along the adjacent end edges of the base plate 105.

In use, the runners 100 are respectively disposed along the lateral side edges of pallet 80, each of the runners 100 being arranged as illustrated in FIGS. 1, 4 and 6, with the upper surface 102 of the base plate 105 in engagement with the bottom surface of the bottom plate 82 of the pallet 80. More particularly, the attachment flange 107 is disposed in engagement with the adjacent side surface of the pallet bottom plate 82, the end flanges 115 being respectively disposed in engagement with the opposite end surfaces of the bottom pallet plate 82 for thereby positioning the runner 100 both laterally and longitudinally with respect to the pallet 80. In this configuration, it will be observed that the guide ridges 110 of the runners 100 extend longitudinally of the pallet 80 and are disposed inwardly of the adjacent side edges thereof. The runners 100 are secured in position on the pallet 80 by means of suitable fasteners, such as nails 119 respectively received through the openings 108 and 109 in the attachment flanges 107 and the base plate 105, as illustrated in FIG. 4.

Referring now to FIGS. 2, 4 and 6 of the drawings, the operation of the runners 100 will be described. It will be appreciated that the dimensions of the pallet 80 and base plates 105 of runners 100 are such that when the runners 100 are secured in position on pallet 80, the serrated bearing surfaces 100 will be spaced apart so as to be respectively received on the rollers 65 of the two flights 60 of the conveyor 50. Thus, when the pallet 80 is lowered into position on the conveyor 50, the rollers 65 will be disposed in engagement with the bearing surfaces 101, with the guide ridges 110 being respectively disposed alongside and laterally inwardly of the adjacent flights of rollers, as best illustrated in FIG. 2. It will be appreciated that the pallet 80 may now roll freely along the conveyor 50, with the rollers 65 disposed in rolling engagement with the bearing surfaces 101 of the runners 100. However, the guide ridges 110 of the runners 100 will cooperate for engagement with the inner edges of the adjacent rollers to limit lateral movement of the pallet 80 with respect to the conveyor 50, thereby positively to guide the pallet 80 along the conveyor 50. In this regard, the curved ends 113 of the guide ridges 110 will curve inwardly away from the adjacent rollers 65 to form rounded, leading and trailing ends for preventing snagging of the guide ridges 110 on the rollers 65, and thereby to facilitate smooth and uninterrupted movement of the pallet 80 along the conveyor 50. In like manner, the upwardly turned flanges 115, and in particular the rounded lower edges 116 thereof, will prevent snagging of the leading and trailing edges of base plate 105 on the rollers 65. Preferably, the conveyor 50 will be provided with suitable braking portions (not shown) for decelerating the pallet 80 at predetermined points along the conveyor 50. The serrations 103 on the bearing surface 101 serve to provide improved frictional engagement of the bearing surface 101 with the braking portions of the conveyor 50 thereby to enhance the braking operation thereof.

The pallet 80 will preferably be constructed of wood or other suitable material, and while the runners 100 may be constructed of any desired material, they will preferably be formed of sheet metal. Further, it will be observed that each of the runners 100 is formed integrally of a single piece of metal to afford simple and economical construction of the runners 100.

From the foregoing, it will be seen that there has been provided a novel combination of a pallet and a pair of runners available to guide the pallet along a conveyor system comprising parallel flights of rollers. More particularly, there has been provided a pallet provided with a pair of metal runners affixed to the bottom surface thereof adjacent to the lateral side edges thereof for respectively being received on flights of rollers.

In addition, there have been provided runners having guide ridges thereon which cooperate to limit lateral movement of the pallet with respect to the conveyor, thereby positively to guide the pallet along the conveyor.

In addition, there have been provided novel runners integrally constructed and having an attachment flange and end flanges thereon for positioning the runner with respect to the pallet, the end flanges also serving to facilitate smooth unobstructed passage of the runners along the conveyor.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a system for conveying packages or the like along an associated conveyor having a pair of parallel laterally spaced apart flights of rollers, the combination comprising a pallet adapted for attachment to the bottom of an associated package for supporting the package thereon; and a pair of integral one-piece elongated runners respectively disposed on the bottom of said pallet substantially parallel to each other and spaced apart for respectively being received on the associated flights of rollers; each of said runners including a base plate having a bearing surface thereon, said bearing surface having a plurality of longitudinally spaced apart serrations formed therein and extending laterally thereof, an attachment flange integral with said base plate along the outer side edge thereof and extending upwardly therefrom substantially normal thereto for engagement with the adjacent outer side surface of said pallet to position said runner thereon, said attachment flange being longitudinally coextensive with said base plate and being provided with a plurality of longitudinally spaced-apart openings therein for receiving fasteners therethrough to attach said runner to the associated pallet, a guide member projecting outwardly from said base plate and extending longitudinally thereof adjacent to the inner side edge thereof, said guide member being substantially arcuate in transverse cross section and having the opposite ends thereof curved outwardly toward the inner side edge of said base plate to insure passage of said guide member along the corresponding side of the adjacent flight of rollers, and a pair of end flanges rspectively integral with said base plate along the leading and trailing edges thereof and extending upwardly therefrom to form rounded leading and trailing ends thereof for facilitating smooth passage of said runner along the associated rollers, said end flanges being respectively disposed in use in engagement with the adjacent end surfaces of said pallet for longitudinally positioning said runner with respect to said pallet, said base plate being provided with a plurality of longitudinally spaced-apart openings therein disposed between said guide member and the inner side edge of said base plat for receiving associated fasteners therethrough to attach said base plate to said pallet, said bearing surfaces of said runners being respectively disposed in use in engagement with the associated flights of rollers for extending longitudinally thereof to facilitate rolling movement of said pallet therealong with said serrations enhancing the engagement between said bearing surface and the associated rollers, said guide members being respectively disposed in use along corrsponding side edges of the associated flights of rollers for cooperation therewith and with each other positively to guide said pallet along the associated conveyor.

* * * * *